United States Patent [19]
Weber

[11] 4,191,717
[45] Mar. 4, 1980

[54] CASTING PROCESS FOR PLASTIC LENSES

[76] Inventor: Hermann P. Weber, 5506 Beckford Ave., Tarzana, Calif. 91356

[21] Appl. No.: 870,749

[22] Filed: Jan. 19, 1978

Related U.S. Application Data

[62] Division of Ser. No. 796,699, May 13, 1977, Pat. No. 4,095,772.

[51] Int. Cl.² .............................................. B29D 11/00
[52] U.S. Cl. ......................................... 264/1; 264/313
[58] Field of Search ...................... 264/1, 313; 425/808

[56] References Cited

U.S. PATENT DOCUMENTS

| | | | |
|---|---|---|---|
| 2,304,217 | 12/1942 | Tillyer | 264/1 |
| 2,333,051 | 10/1943 | Smith | 264/1 |
| 2,406,361 | 8/1946 | Fairbanks et al. | 264/1 |
| 2,479,935 | 8/1949 | Johnson | 264/1 |
| 3,056,166 | 10/1962 | Weinberg | 264/1 |
| 3,240,854 | 3/1966 | Ewer | 264/1 |
| 3,278,654 | 10/1966 | Grandperret | 425/808 |
| 3,337,659 | 8/1967 | Grandperret | 264/1 |
| 3,555,611 | 1/1971 | Reiterman | 425/808 |
| 3,761,208 | 9/1973 | Bondet et al. | 264/1 |
| 4,008,031 | 2/1977 | Weber | 264/1 |
| 4,113,224 | 9/1978 | Clark et al. | 264/1 |
| 4,121,896 | 10/1978 | Shepherd | 425/808 |

FOREIGN PATENT DOCUMENTS

| | | | |
|---|---|---|---|
| 597171 | 5/1960 | Canada | 264/1 |
| 916377 | 1/1963 | United Kingdom | 264/1 |

*Primary Examiner*—James B. Lowe
*Attorney, Agent, or Firm*—Blakely, Sokoloff, Taylor & Zafman

[57] ABSTRACT

A process and apparatus particularly suited for casting ophthalmic lenses from a liquid monomer such as "CR-39". The liquid monomer and a catalyst are metered into a plastic lower mold member. A plastic upper mold member is supported by the upper surface of the liquid and by a suspension arrangement which includes a spacer ring and a plurality of ears extending from the upper mold member. The upper mold member is controllably drawn downwardly as the liquid plastic solidifies. Optical surfaces are obtained without polishing or other finishing.

3 Claims, 14 Drawing Figures

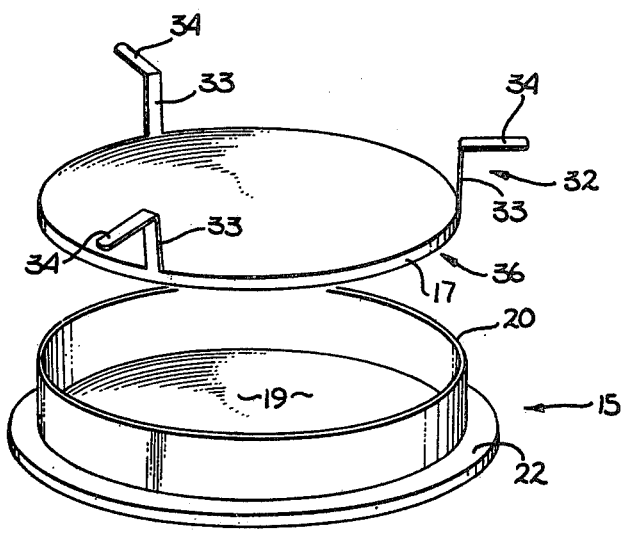
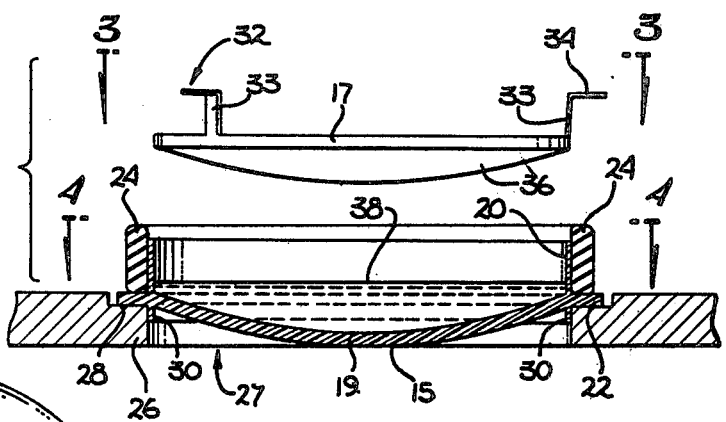
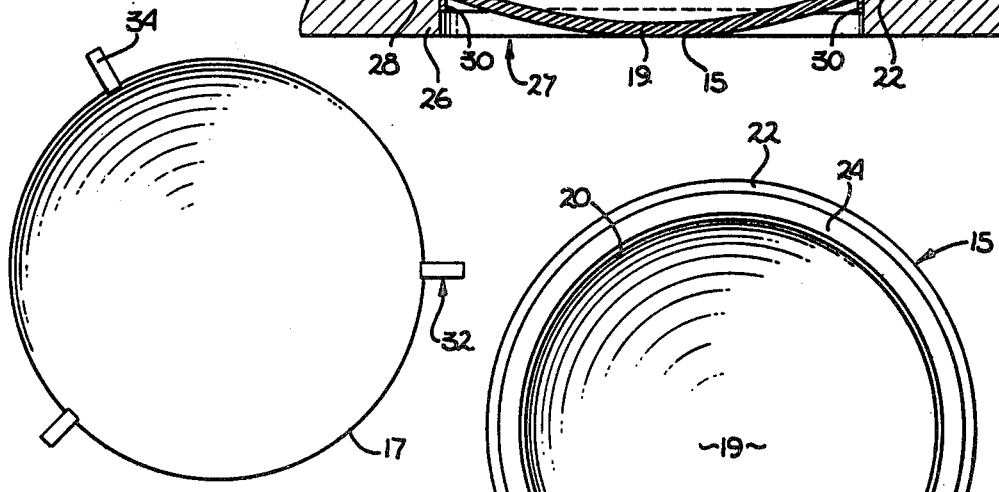
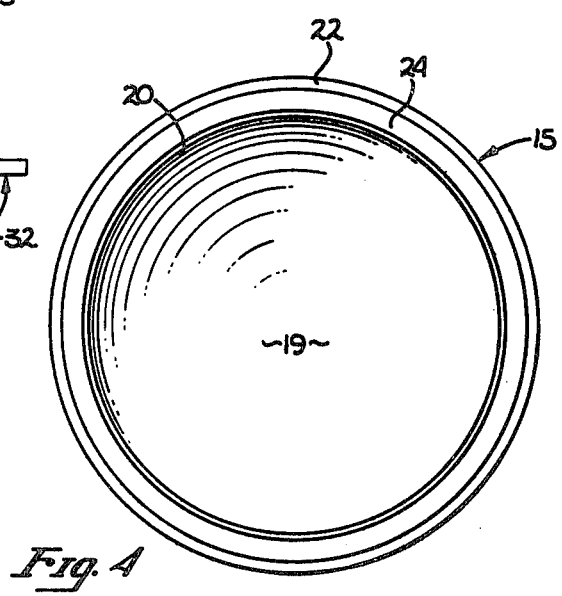

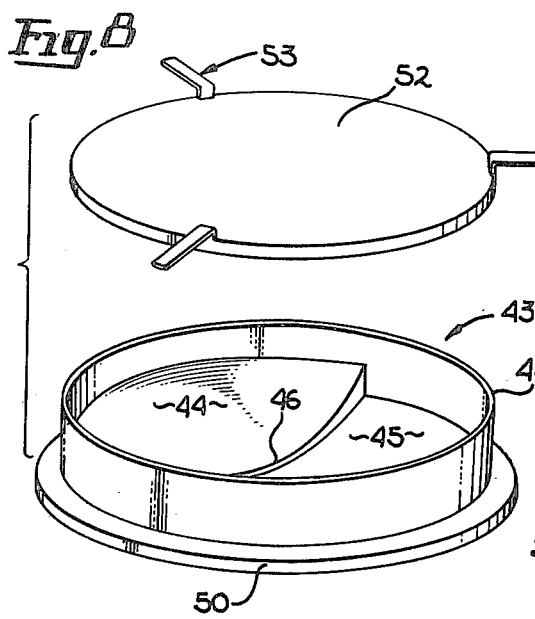
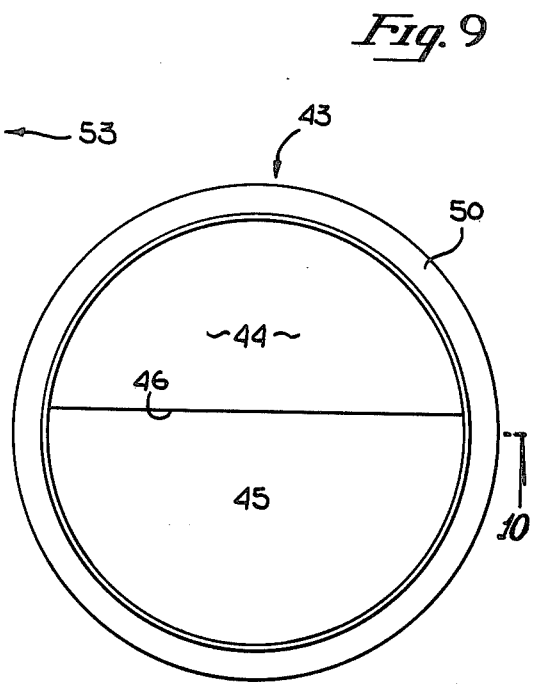
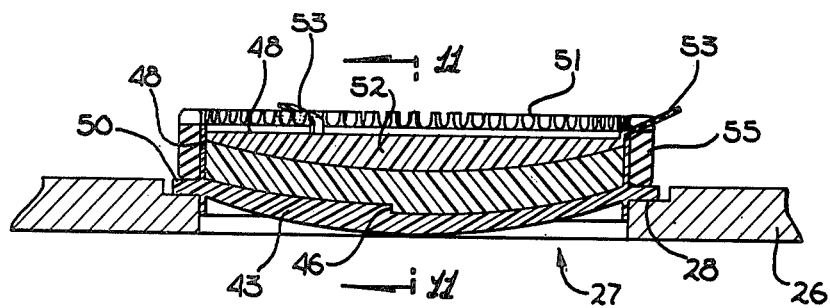
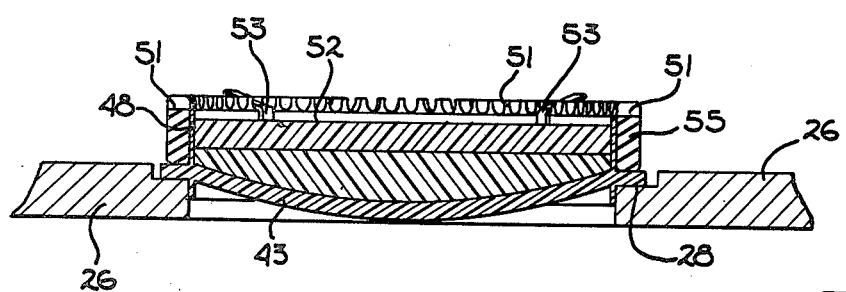

CASTING PROCESS FOR PLASTIC LENSES

This is a division of application Ser. No. 796,699, filed May 13, 1977, now U.S. Pat. No. 4,095,772.

BACKGROUND OF THE INVENTION

1. Field of the Invention

The invention relates to the field of casting processes and apparatus for lenses fabricated from liquid plastics.

2. Prior Art

In recent years considerable attention in the opthalmic industry has been given to plastic lenses for eyeglasses. This interest has been prompted in part by governmental regulations on the shatter-resistance of lenses and by the popularity of larger eyeglass lenses. It is costly to meet new shatter-resistance standards or form these larger lenses with glass, in addition to the fact that larger glass lenses are relatively heavy and cannot be tinted.

Methods have been developed for fabricating these plastic lenses by casting them from liquid plastic. A transparent plastic such as a thermosetting allyl diglycol carbonate, known commercially as "CR-39" and distributed by Pittsburgh Plate Glass Company, is commonly used. This liquid monomer is solidified after mixing with a catalyst such as isopropyl percarbonate or isopropyl peroxide. The solidification of this liquid plastic is characterized by substantial shrinkage. Numerous techniques have been developed to permit the fabrication of optical surfaces despite this shrinkage.

The currently most widely used method for forming the "CR-39" lenses employs two glass mold halves spaced apart by an annular gasket. The liquid plastic is injected through the gasket into a cavity defined between the glass mold halves. A clamp is employed to apply pressure to these mold halves in order to keep the mold halves in contact with the solidifying plastic and to prevent leaking. For a discussion of this method, see U.S. Pat. Nos. 3,070,846 and 3,136,000. Among the problems with this prior art casting method is that a plurality of different gaskets are required in order to provide the typical range of prescription lenses and moreover, the glass mold halves are relatively expensive and not always reuseable.

Another prior art method for forming these plastic lenses in which a flexible element is used to form an upper and lower cavity in a single mold is described in U.S. Pat. No. 3,211,811.

Still another prior art technique for forming lenses from a liquid plastic employing a press is described in U.S. Pat. No. 3,380,718.

As will be seen, the invented process and apparatus does not require a plurality of different gaskets. Moreover, in the presently preferred embodiment, optical surfaces are obtained employing plastic molds, without polishing the cast lenses.

SUMMARY OF THE INVENTION

An apparatus and method for casting a lens from a liquid plastic is described. The liquid plastic is poured into a lower mold member which defines a first lens casting surface. The other lens casting surface is defined by an upper mold member which is supported in part by the upper surface of the liquid plastic. The apparatus includes suspension means for suspending the upper mold member above the lower mold member so as to define a cavity between the first and second lens surfaces of the mold members. This suspension means maintains the upper and lower mold members parallel to one another while allowing the upper mold member to be drawn towards the lower mold member as the liquid plastic cures in the cavity. In the presently preferred embodiment, the suspension means comprises a spacer ring disposed about the lower mold member and a plurality of flexible ears which extend from the upper mold member and which rests upon the upper annular surface of the spacer ring. These ears bend as the upper mold member is drawn downwardly by the action of the curing plastic and maintain the molds parallel to one another.

In the presently preferred embodiment, a thermosetting allyl diglycol carbonate (CR-39) is used as the liquid plastic. The upper and lower mold members are fabricated from a polyamide having an amorphous surface. In particular, a terephthalic acid and alkyl substituted hexamethylenediamine is employed.

BRIEF DESCRIPTION OF THE DRAWINGS

FIG. 1 is a perspective view of the upper and lower mold members. The ears on the upper mold member are clearly illustrated in this view.

FIG. 2 is a cross-sectional elevation view of the lower mold member disposed in a partially illustrated tray with a spacer ring disposed about the lower mold member. The upper mold member is also shown in this figure prior to its engagement with the lower mold member.

FIG. 3 is a plan view of the upper mold member taken along section line 3—3 of FIG. 2.

FIG. 4 is a plan view of the lower mold member taken along section line 4—4 of FIG. 2.

FIG. 8 is a perspective view of a lower mold member employed for forming a bifocal lens and a upper mold member.

FIG. 9 is a plan view of the lower mold member of FIG. 8.

FIG. 10 is a cross-sectional elevation view of the upper and lower mold members of FIG. 8 taken generally along section line 10—10 of FIG. 9; and FIG. 11 is a cross-sectional elevation view of the molds of FIG. 10 taken through section line 11—11 of FIG. 10.

DETAILED DESCRIPTION OF THE INVENTION

Figure 5:
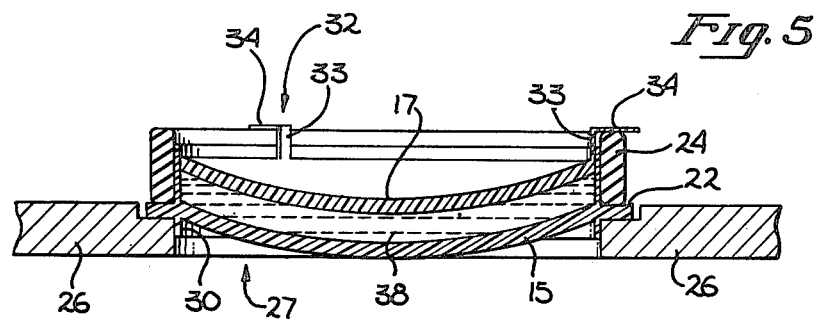
FIG. 5 is a cross-sectional elevation view of the upper and lower mold members showing the upper mold member in engagement with the lower mold member and the spacer ring.

A process and apparatus is described which is particularly suitable for casting optical lenses for eyeglasses from a liquid plastic and in particular, from a liquid monomer known commercially as "CR-39", however other monomers maybe employed. The presently preferred embodiment is described below including numerous specific details such as specific temperatures, etc. These details are included to provide a thorough understanding of the disclosed inventive concepts. However, it will be obvious to one skilled in the art that these inventive concepts may be practiced without employing the specific details.

In the presently preferred embodiment, a transparent liquid plastic, comprising a thermosetting allyl diglycol carbonate is employed for casting the lenses. This monomer which is a liquid at room temperature is commonly employed for fabricating lenses and is commercially known as "CR-39" and distributed by the Pittsburgh Plate Glass Company. Solidification occurs when the monomer is mixed with a catalyst such as isopropyl percarbonate or isopropyl peroxide. The catalyzed monomer as is known may be stored, for example, under refrigeration prior to its use. The polymerization is activated by raising the temperature of the catalyzed monomer. Well-known techniques are employed for preparing this monomer including known filtering techniques, thus they have not been set forth in this application. In the presently preferred embodiment, "CR-39" is employed with 4% by volume of isopropyl peroxide as the catalyst as will be described in more detail.

In prior art processes often methyl methacrylic or other additives are mixed with the monomer to prolong the glass mold life. This results in softer, less desireable lenses. With the invented apparatus and process this additive is not needed, thus harder lenses are produced.

Referring to FIGS. 1 and 2, in all the embodiments described, a lower mold member such as mold member 15 and an upper mold member such as mold member 36 are employed to define a lens cavity. More specifically, the cavity is defined by the concave casting surface 19 of member 15, and the convex casting surface 36 of member 17. By employing different curved surfaces such as surfaces 19 and 36, lenses of different power may be obtained as is well-known in the art. As will be seen in the presently preferred embodiment, the thickness of the lens is determined by the amount of liquid plastic which is metered into the lower mold member 15.

The upper and lower mold members themselves are fabricated from plastic by injection molding. The optical casting surfaces 19 and 36 may be formed employing glass or metal optical inserts without polishing. These mold members which may be reused after a casting with the invented process, are inexpensively fabricated, particularly when compared to the glass molds employed in the prior art processes. In the presently preferred embodiment, the mold members are fabricated from an amorphous, transparent polyamide. The amorphous surface of this material has been found to provide excellent lenses without the release marks frequently encountered with the prior art "CR-39" casting processes. The presently preferred mold material is made by polycondensation from terephthalic acid, and alkyl substituted hexamethylenediamine.

Referring now to FIGS. 1 and 2, the concave surface 19 of the lower mold member 15 along with the upright annular rim 20 are adaptable for receiving the liquid plastic 38 as shown in FIG. 2. An integral generally circular lip 22 disposed about the exterior of the mold member 15 allows the mold member to be placed in a horizontal position within a tray 26. The lower mold member extends into the aperture 27 of the tray with the lip 22 engaging an annular shoulder 28 of the tray. An integrally formed lower rim 30 (FIG. 2) assures that the lower mold member 15 remains fixed within the tray 26.

The upper mold member 17 as may be seen in FIGS. 1, 2 and 3, includes a plurality of integral, flexible suspension ears 32. Each of these ears includes a vertical section 33 and a generally horizontal section 34. As will be described, these flexible ears allow the upper mold member to be positioned on the upper surface of the liquid plastic and provide a means for maintaining the upper mold parallel to the lower mold while the upper mold is drawn downwardly by the curing plastic.

An annular spacer ring 24 (FIGS. 2 and 4) which may be a metal or a plastic ring is disposed about the outer surface of rim 20 and extends upwardly above the upper edge of rim 20.

As is best seen in FIG. 5, when a proper amount of liquid plastic 38 has been metered into the lower mold member and when the upper mold member is brought in contact with the upper surface of the liquid, the horizontal sections 34 of the suspension ears 32 engage the upper annular surface of the spacer ring 24.

Figure 6:
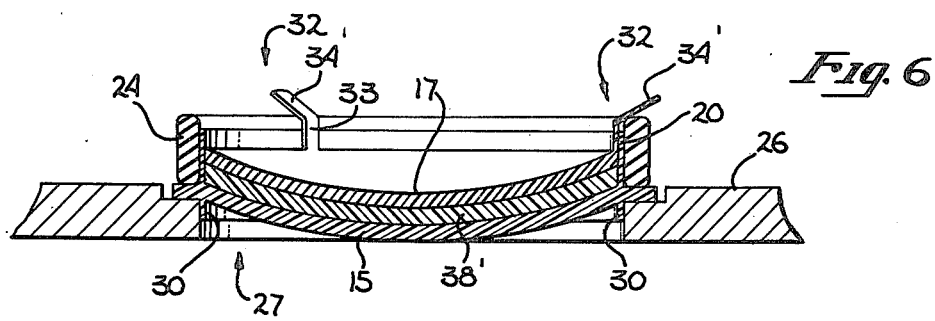
FIG. 6 illustrates the mold members of FIG. 5 after the liquid plastic disposed between these members has cured.

As is seen in FIG. 6, as the plastic cures as shown by plastic 38', the upper mold is drawn downwardly by the shrinking plastic. This causes the horizontal sections of the ears 32 to be urged upwardly as shown by sections 34' of FIG. 6. The flexible ears (three evenly spaced ears in the presently preferred embodiment) maintain the upper and lower mold members parallel to one another during the curing. If the upper mold member, by way of example, is drawn downwardly more on one side than the other, the ear adjacent to this lower side applies more force to the mold member than do the other ears. This tends to cause the other side of the upper mold member to be more rapidly drawn downwardly, thereby making the mold members parallel (self compensation). Moreover, these ears provide steady support for the upper mold members against the movement of air in the curing oven. This is very important since otherwise a nonuniform lens (a prism) would result.

In a typical process a predetermined volume of the liquid plastic (monomer and catalyst) is poured into the lower mold members as shown by liquid plastic 38 of FIG. 2. (Note, there are no leaking problems such as we often encountered with prior art processes). Then the upper mold member 17 is placed on the upper surface of the liquid. The length of the sections 33 and the height of the spacer ring 24 permits the horizontal sections 34 of the ears 32 to rest on the upper surface of the ring 24 when a cavity having a predetermined thickness is formed between the mold members as shown in FIG. 5. The metered volume of the liquid plastic corresponds to the volume of the cavity.

Figure 7:
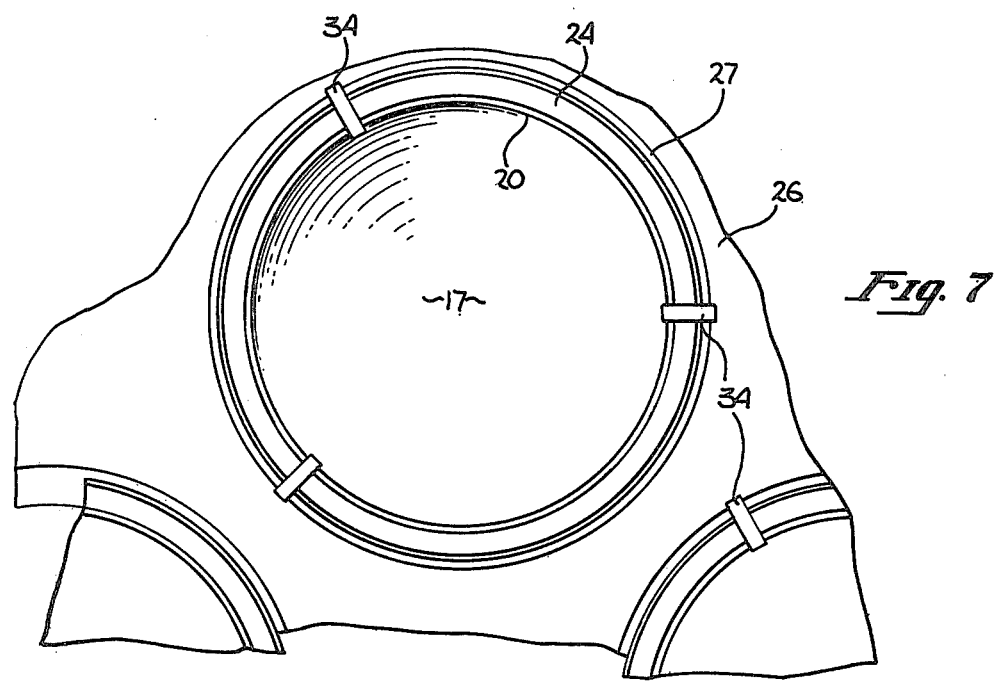
FIG. 7 is a plan view illustrating the mold members of FIG. 5 in addition to other partially shown mold members all disposed in a common casting tray.

Typically, a plurality of lenses are simultaneously cured in a tray, such as tray 26 (FIG. 7). The tray is placed with a forced air oven which starts the polymerization at temperatures of 100° to 110° F. with curing times ranging from five to sixteen hours. These ovens as is well-known in the art, provide forced air cooling to maintain predetermined temperatures since significant heat is generated by the curing plastic. If cooling is not provided, the plastic may crack during curing (exothermic).

By way of example, in the fabrication of a −1.5 diopter lens having a minimum thickness of approximately 2.5 millimeters, fourteen millileters of liquid (CR-39 with 4% isopropyl peroxide) are poured into the lower mold member. After the upper mold member has been placed on the spacer ring such that the lower optical surface of this mold member is partially supported by the liquid, the tray is placed within the oven at an initial temperature of 110° F. The temperature is gradually increased over an 11.75 hour period to 150° F. The resultant lens has a weight of approximately 14.5 grams.

In another example, employing a faster curing cycle, a −1.0 diopter lens having a minimum thickness of 1.6 millimeters and a finished weight of 12.0 grams is again placed in an oven at an initial temperature of 110° F. The temperature is then raised to 115° F. in fifteen minutes; to 118° F. in the next thirty minutes; to 125° F. in the next fifteen minutes; to 130° F. in the next fifteen minutes; to 135° F. in the next seven minutes and then remains constant at 135° F. for a period of forty minutes. Then the temperature is raised to 140° F. during the next thirty minutes; to 145° F. in the next thirty minutes; to 147° F. in the next fifteen minutes; to 149° F. in the next fifteen minutes; to 151° F. in the next ten minutes; to 153° F. in the next ten minutes; to 156° F. in the next ten minutes; to 164° F. in the next fifteen minutes and to 167° F. in the next twenty minutes.

After removal from the oven and cooling, the upper and lower mold members are urged apart from the lense. During the entire curing the mold members are in intimate contact with the cast lens. It has been found that the mold members with their amorphous surfaces provide excellent lenses without the release marks often encountered in the prior art.

In FIGS. 8 through 11, the above described apparatus and process may be employed to fabricate bifocal lenses. In FIG. 8, a lower mold member 43 is illustrated which again includes a lip 50 and an upright rim 48. The lower mold member 43 includes two optical surfaces 44 and 45 separated at ledge 46 (FIGS. 8 and 9). Concave surfaces 44 and 45 each have a different curvature. Typically surface 44 is the distance segment and surface 45 the reading segment.

The upper mold member 52 again includes a plurality of ears 53 as is illustrated in FIGS. 8, 10 and 11. The optical surface 56 of this mold member is cylindrical and when this mold member is brought into engagement with the spacer ring 55, the axis of the surface is placed relative to the ledge 46 of the lower mold member to provide the desired powers of the resultant lenses. Notches 51 on spacer ring 55 (at 5° intervals) provide a means to align the axis of upper mold member 52 with the ledge 46.

As illustrated in FIG. 10, a lens is formed in the same manner as described with the previous embodiment, again with the lower mold member engaging the tray 26. The shrinkage of the curing plastic draws the upper mold member downwardly causing the horizontal sections of the ears 53 to bend upwardly as is shown in FIGS. 10 and 11. In FIGS. 10 and 11, the two sections of the bifocal lens are shown to illustrate the fact that a finished bifocal lens is fabricated.

Figure 12:
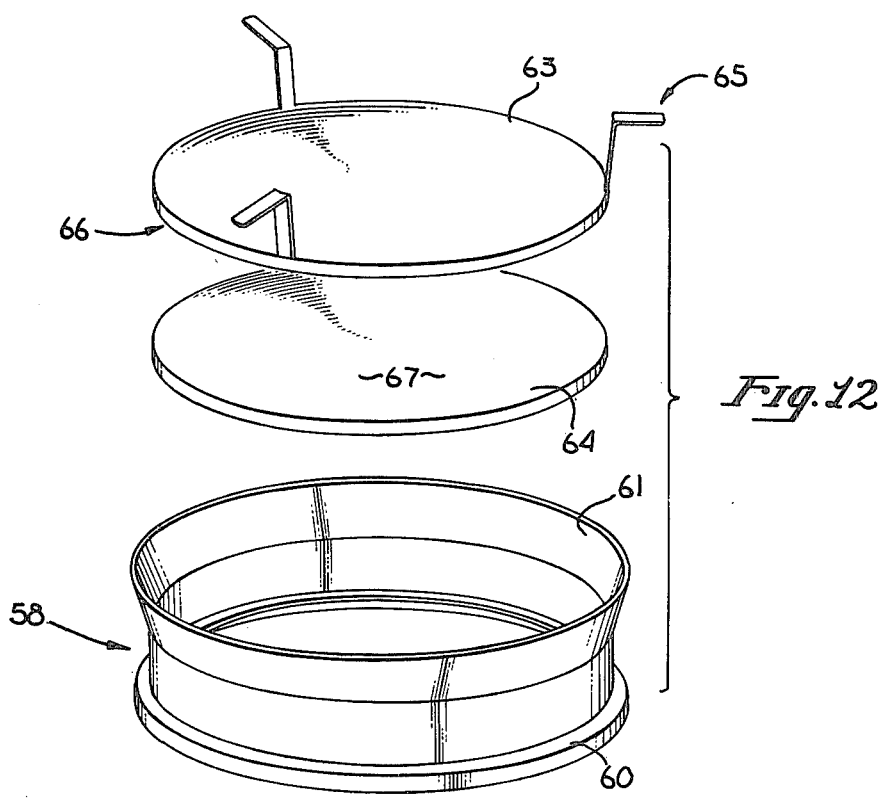
FIG. 12 is a perspective view of an alternate embodiment of a casting apparatus and illustrates a holder ring, lower mold member and upper mold member.
Figure 13:
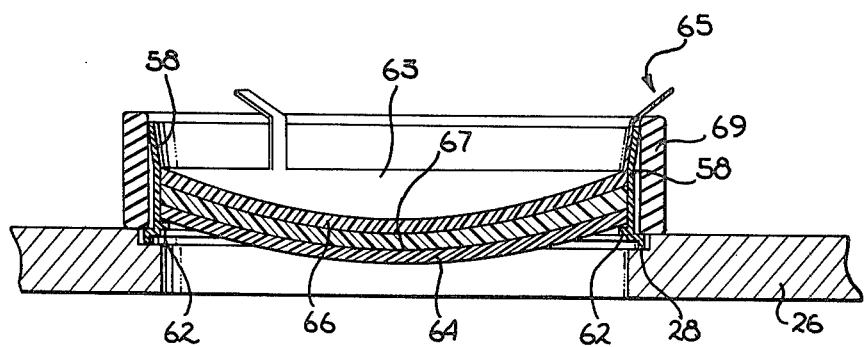
FIG. 13 is a cross-sectional elevation view of the apparatus of FIG. 12 illustrating the apparatus after a lens has been cured between the upper and lower mold members.

In FIGS. 12 through 13, an alternate embodiment of the casting apparatus is illustrated. In this embodiment the lower mold member 64 does not include an upright rim but rather side walls for the lower mold member are provided by the ring 58. The ring 58 is a generally annular member which defines an internal lip 62. The lower mold member 64 rests upon the lip 62. The ring 58 includes a lip 60 for engaging the shoulder 28 of the tray 26. The upright rim 61 of the ring 58 allows liquid plastic to be metered onto the integral concave surface 67. Again, an upper mold member 63 having a convex surface 66 is employed; the upper mold member includes a plurality of ears 69 which as in the previous embodiments engage a spacer ring 69. The lens is formed in a cavity defined by the surfaces 66 and 67 as shown in FIG. 13.

In this embodiment the ring 58 may be fabricated from a soft plastic material which may be readily removed from the mold members once the plastic has cured. (CR-39 does not adhere to ring 58). Note that with this embodiment the lower mold member 64 is similar in overall shape to the upper mold member except for the ears 65. By employing the ring 58 both the upper and lower mold members may be fabricated with integral ears and the ears removed for the lower mold members. In this manner, the number of molds required to form a complete set of prescription lenses is greatly reduced.

Figure 14:
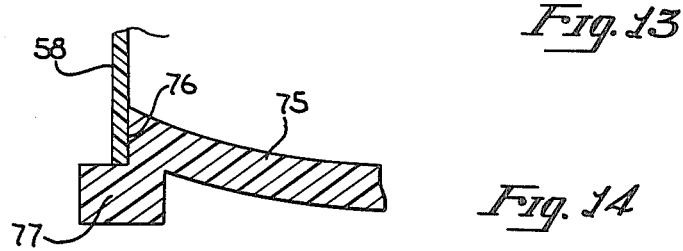
FIG. 14 is a partial, cross-sectional view of another embodiment of the lower mold member and a casting ring.

In FIG. 14 an alternate lower mold member is illustrated which may be employed with the ring 58 of FIGS. 12 and 13. The member 75 includes an annular base 77 and a circular shoulder 76. this shoulder sealingly engages ring 58 to prevent the liquid plastic from leaking.

Another advantage to the described apparatus and process is that tinted lenses may readily be fabricated. With the prior art "CR-39" processer stress marks sometimes result which prevent subsequent tinting of the lenses. Because of the relative freedom of the upper mold member, stress marks do not result with the invented apparatus and process, thus tinting is possible after the lenses have been cast.

Thus, an apparatus and method has been described or fabricating "CR-39" lenses. Unlike the prior art process, plastic molds are employed which are substantially less expensive than glass molds. The large assortments of gaskets required for one commonly employed prior art process is not required with the invented apparatus and process.

I claim:

1. A process for forming a lens from a liquid plastic comprising the steps of:

metering a predetermined amount of said liquid plastic into a lower mold having a first optical surface;

placing an upper mold having a flexible support and a second optical surface on the upper surface of said liquid, said upper mold partly supported by said lower mold and partly supported by said liquid plastic;

said flexible support comprising a plurality of flexible ears providing self-compensation by which said upper mold will resist the downward movement of said mold during curing;

curing said plastic and at the same time controllably drawing down said upper mold against said resistance of said flexible ears by the action of said curing plastic and maintaining said upper mold parallel to said lower mold;

said drawing down step including the upward bending of said flexible ears;

whereby a lens is formed between said first and second optical surfaces.

2. The process defined by claim 1 wherein said curing includes placing the molds and liquid plastic in a forced air cooling oven so as to remove heat from said curing plastic.

3. The process defined by claim 2 wherein said curing in said oven begins at a temperature of approximately 110° F. and where said temperature is increased as said curing progresses.

* * * * *